United States Patent
Rasekh

(10) Patent No.: US 10,984,163 B1
(45) Date of Patent: *Apr. 20, 2021

(54) SYSTEMS AND METHODS FOR PARALLEL TRANSIENT ANALYSIS AND SIMULATION

(71) Applicant: ANSYS, INC., Canonsburg, PA (US)

(72) Inventor: Ehsan Rasekh, Cambridge, MA (US)

(73) Assignee: ANSYS, INC., Canonsburg, PA (US)

( * ) Notice: Subject to any disclaimer, the term of this patent is extended or adjusted under 35 U.S.C. 154(b) by 107 days.

This patent is subject to a terminal disclaimer.

(21) Appl. No.: 16/460,836

(22) Filed: Jul. 2, 2019

Related U.S. Application Data

(63) Continuation of application No. 14/742,265, filed on Jun. 17, 2015, now Pat. No. 10,380,290.

(60) Provisional application No. 62/016,417, filed on Jun. 24, 2014.

(51) Int. Cl.
*G06G 7/48* (2006.01)
*G06F 30/367* (2020.01)

(52) U.S. Cl.
CPC .................. *G06F 30/367* (2020.01)

(58) Field of Classification Search
CPC .................................... G06F 30/367
See application file for complete search history.

(56) References Cited

U.S. PATENT DOCUMENTS 5,663,890 A * 9/1997 Saleh ............... G06F 30/367
703/4
6,405,348 B1 * 6/2002 Fallah-Tehrani .... G06F 30/3312
716/113

* cited by examiner

*Primary Examiner* — Rehana Perveen
*Assistant Examiner* — Nithya J. Moll
(74) *Attorney, Agent, or Firm* — Womble Bond Dickinson (US) LLP

(57) ABSTRACT

Systems and methods are provided for performing parallel transient simulations for an electrical circuit. A plurality of segments are generated from a simulation length, and simulations are performed using a plurality of processors for the segments to generate simulation results. An output is generated based at least in part on the simulation results.

20 Claims, 10 Drawing Sheets

SYSTEMS AND METHODS FOR PARALLEL TRANSIENT ANALYSIS AND SIMULATION

CROSS REFERENCE TO RELATED APPLICATIONS

This application is a continuation application of U.S. patent application Ser. No. 14/742,265, entitled "Systems and Methods for Parallel Transient Analysis and Simulation," filed Jun. 17, 2015, which claims priority to U.S. Provisional Patent Application No. 62/016,417, entitled "Systems and Methods for Parallel Transient Analysis and Simulation," filed Jun. 24, 2014, both of which are herein incorporated by reference in their entirety.

TECHNICAL FIELD

The present disclosure relates generally to the field of circuit simulations, and, more specifically, to parallel computing for circuit simulations.

BACKGROUND

Computer aided circuit analysis programs are often used to perform analyses and simulations of electrical circuits. Verification and prediction of timing behavior of electrical circuits, e.g., through transient analyses and simulations, are important for circuit design. Particularly, transient analyses and simulations often involve computing a circuit solution as a function of time over a certain time range.

SUMMARY

As disclosed herein, processor-implemented systems and methods are provided for performing parallel transient simulations for an electrical circuit. The system includes: a plurality of data processors and a non-transitory computer-readable storage medium. The plurality of data processors are configured to: generate a plurality of segments from a simulation length for an electrical circuit, the plurality of segments corresponding to the plurality of data processors; add one or more overlap time periods to one or more of the segments; perform transient simulations for the plurality of segments in parallel to generate simulation results for the electrical circuit; remove part of the simulation results associated with the one or more overlap time periods; and generate a simulation output for the electrical circuit based at least in part on the removal of the simulation results associated with the one or more overlap time periods. The non-transitory computer-readable storage medium is configured to store data related to the simulation results, data related to the plurality of segments, and data related to the one or more overlap time periods.

As an example, a processor-implemented system is provided for performing parallel transient simulations for an electrical circuit. The system includes: a plurality of data processors and a non-transitory computer-readable storage medium. The plurality of data processors are configured to: generate a plurality of segments from a simulation length for an electrical circuit, the plurality of segments corresponding to the plurality of data processors; add the one or more overlap time periods of a duration to one or more of the segments; perform transient simulations for the plurality of segments in parallel to generate simulation results for the electrical circuit; calculate one or more error parameters associated with the one or more overlap time periods; in response to the one or more error parameters not being within a range, adjust the duration of the one or more overlap time periods until the one or more error parameters fall within the range; and in response to the one or more error parameters being within the range, generate a simulation output based at least in part on the simulation results. The non-transitory computer-readable storage medium is configured to store data related to the simulation results, data related to the one or more error parameters, and data related to the one or more overlap time periods.

As another example, a processor-implemented method is provided for performing parallel transient simulations for an electrical circuit. The method includes: generating, using a plurality of data processors, a plurality of segments from a simulation length for an electrical circuit, the plurality of segments corresponding to the plurality of data processors; adding one or more overlap time periods to one or more of the segments; performing, using the plurality of data processors, transient simulations for the plurality of segments in parallel to generate simulation results for the electrical circuit, the simulation results being stored in one or more non-transitory computer-readable storage media; removing, using the plurality of data processors, part of the simulation results associated with the one or more overlap time periods; and generating, using the plurality of data processors, a simulation output for the electrical circuit based at least in part on the removal of the simulation results associated with the one or more overlap time periods.

As yet another example, a processor-implemented method is provided for performing parallel transient simulations for an electrical circuit. The method includes: generating, using a plurality of data processors, a plurality of segments from a simulation length for an electrical circuit, the plurality of segments corresponding to the plurality of data processors; adding, using the plurality of data processors, the one or more overlap time periods of a duration to one or more of the segments; performing, using the plurality of data processors, transient simulations for the plurality of segments in parallel to generate simulation results for the electrical circuit; calculating, using the plurality of data processors, one or more error parameters associated with the one or more overlap time periods; in response to the one or more error parameters not being within a range, adjusting the duration of the one or more overlap time periods until the one or more error parameters fall within the range; and in response to the one or more error parameters being within the range, generating, using the plurality of data processors, a simulation output based at least in part on the simulation results.

As yet another example, a non-transitory computer-readable storage medium is encoded with instructions for commanding a plurality of data processors to execute operations of a method for performing parallel transient simulations for an electrical circuit. The method includes: generating a plurality of segments from a simulation length for an electrical circuit, the plurality of segments corresponding to the plurality of data processors; adding one or more overlap time periods to one or more of the segments; performing transient simulations for the plurality of segments in parallel to generate simulation results for the electrical circuit; removing part of the simulation results associated with the one or more overlap time periods; and generating a simulation output for the electrical circuit based at least in part on the removal of the simulation results associated with the one or more overlap time periods.

As yet another example, a non-transitory computer-readable storage medium is encoded with instructions for commanding a plurality of data processors to execute operations of a method for performing parallel transient simulations for an electrical circuit. The method includes: generating a plurality of segments from a simulation length for an electrical circuit, the plurality of segments corresponding to the plurality of data processors; adding the one or more overlap time periods of a duration to one or more of the segments; performing transient simulations for the plurality of segments in parallel to generate simulation results for the electrical circuit; calculating one or more error parameters associated with the one or more overlap time periods; in response to the one or more error parameters not being within a range, adjusting the duration of the one or more overlap time periods until the one or more error parameters fall within the range; and in response to the one or more error parameters being within the range, generating a simulation output based at least in part on the simulation results.

DETAILED DESCRIPTION

Figure 1:
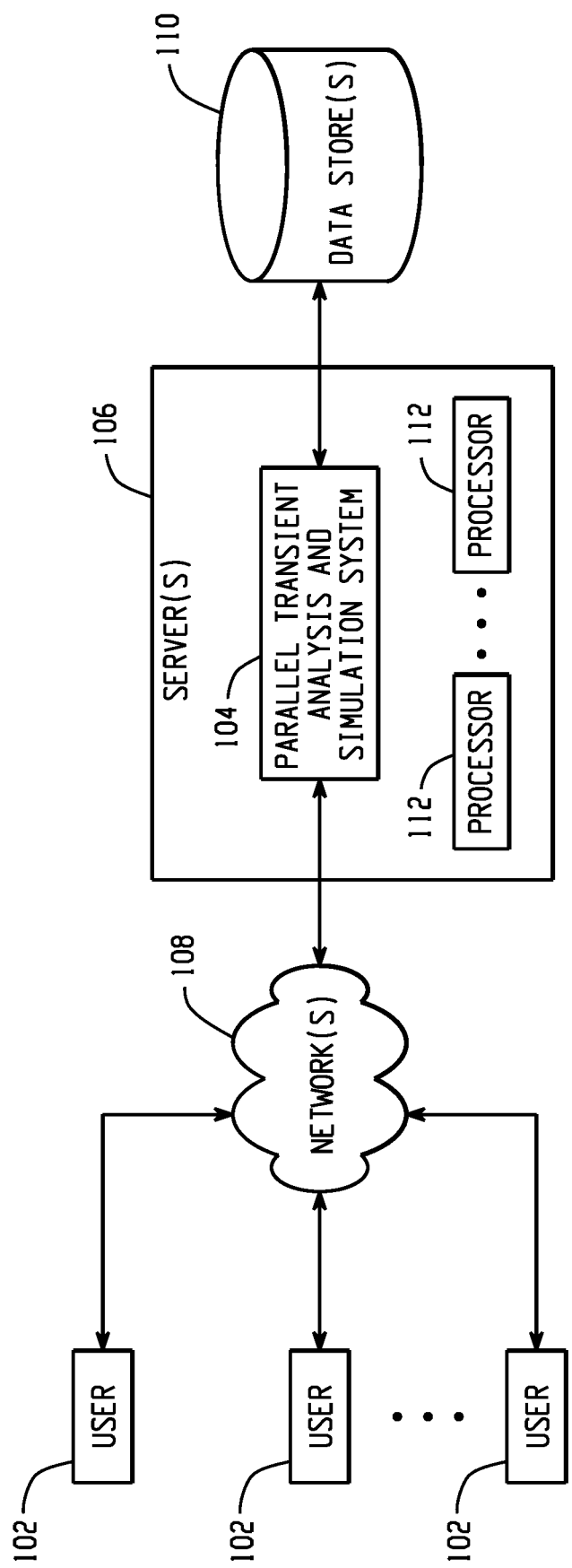
FIG. 1 depicts an example computer-implemented environment wherein users can interact with a parallel transient analysis and simulation system hosted on one or more servers through a network.

FIG. 1 depicts an example computer-implemented environment wherein users can interact with a parallel transient analysis and simulation system hosted on one or more servers through a network. The parallel transient analysis and simulation system 104 can assist the users 102 to perform transient analyses and simulations of electrical circuits using parallel computing. Specifically, the parallel transient analysis and simulation system 104 implements multiple processors 112 (e.g., central processing unit cores) for performing faster transient analyses and simulations to solve problems related to bit patterns (e.g., a sequence of bits, in a memory, in a communications channel, in an electronic device, etc.). For example, the parallel transient analysis and simulation system 104 divides a certain time range (e.g., a simulation length) into multiple windows that correspond to the processes 112 respectively. Each processor is used to perform simulations for a particular window. Part of the simulation results associated with certain windows are discarded to ensure accuracy.

As shown in FIG. 1, the users 102 can interact with the parallel transient analysis and simulation system 104 through a number of ways, such as over one or more networks 108. One or more servers 106 accessible through the network(s) 108 can host the parallel transient analysis and simulation system 104. The one or more servers 106 can also contain or have access to one or more data stores 110 for storing data for the parallel transient analysis and simulation system 104. The one or more servers 106 contain multiple processors for data processing.

Figure 2:
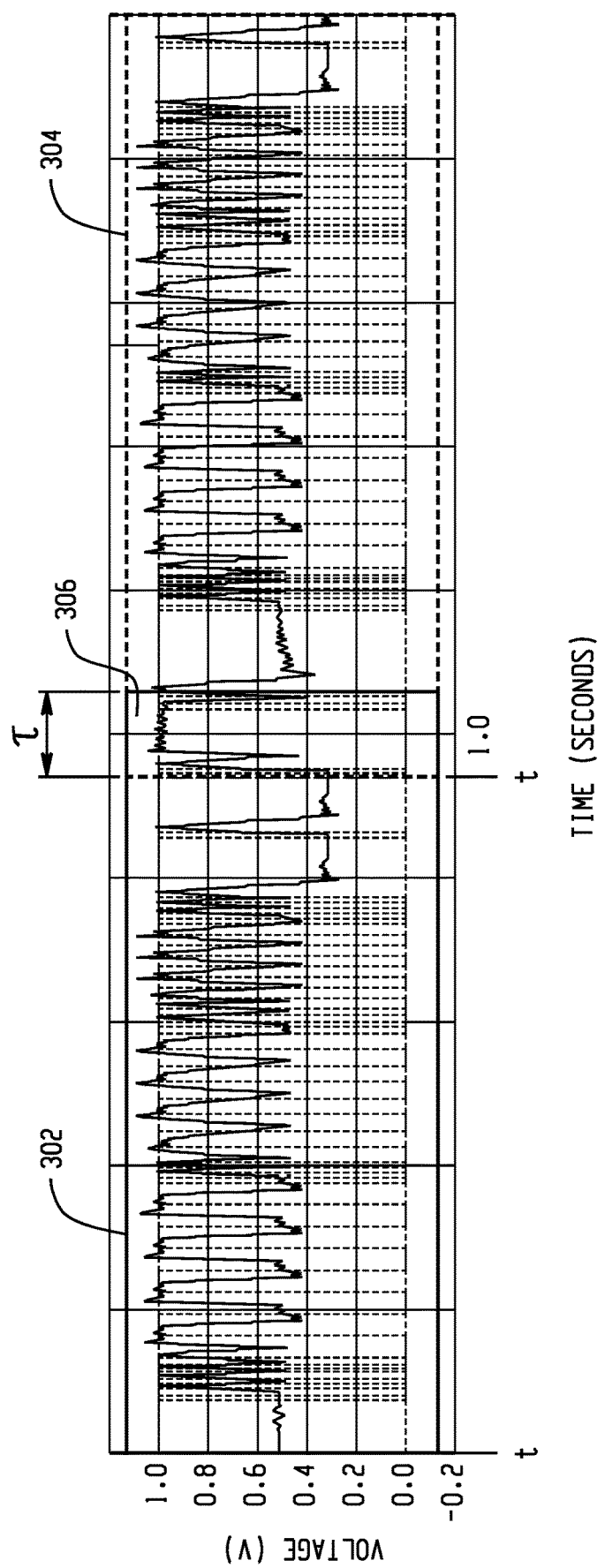
FIG. 2-FIG. 5 depict example diagrams showing a parallel time domain window technique for performing transient analyses and simulations.
Figure 6A:
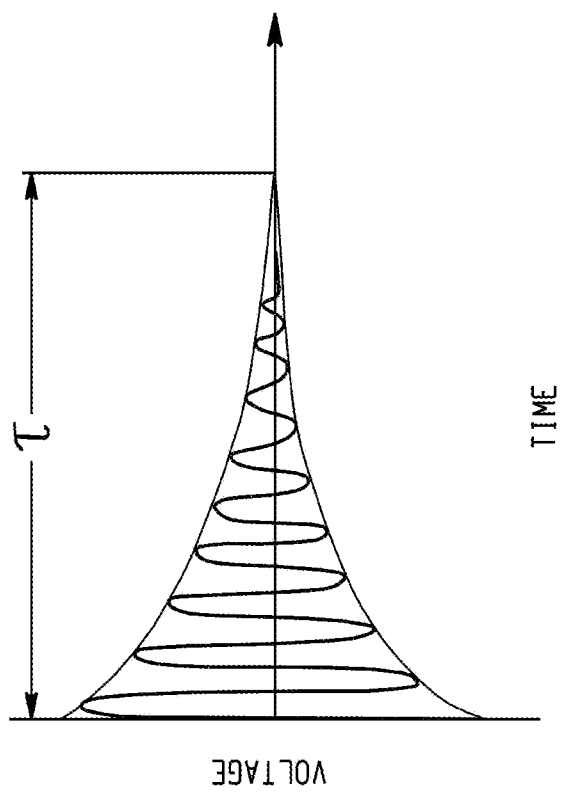
FIG. 6(A) and FIG. 6(B) depict example diagrams showing a time constant of an electrical circuit.
Figure 6B:
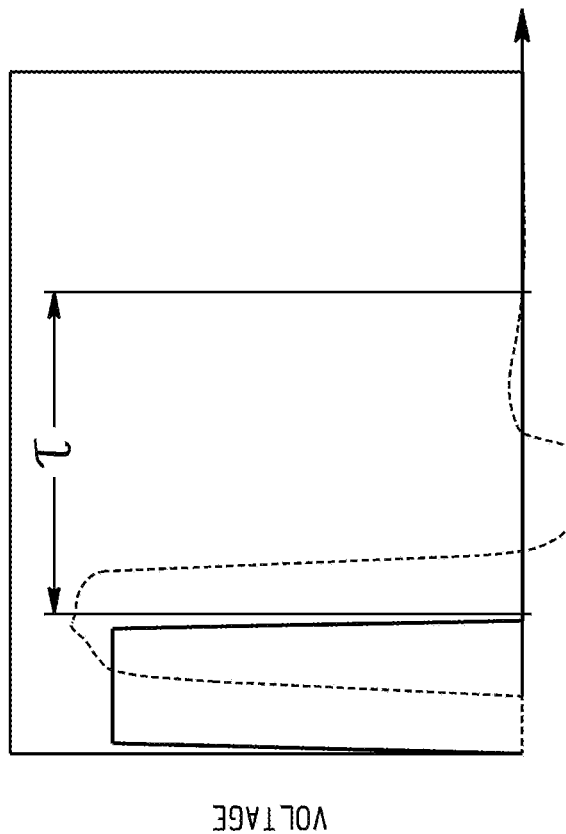

The parallel transient analysis and simulation system 104 adopts a parallel time domain window technique to perform transient analyses and simulations. Specifically, the parallel transient analysis and simulation system 104 divides a particular simulation length into multiple windows for parallel transient analyses and simulations. For example, as shown in FIG. 2, two adjacent windows 302 and 304 are generated by dividing a simulation length, where the window 302 precedes the window 304. An overlap time period 306 that has a specific duration (e.g., equal to or larger than a time constant $\tau$) is padded to the beginning of the window 304. As a result, the window 304 begins at a time $t_{green}$, instead of the end of the window 302. The time constant t corresponds to the time during which all transients of the electrical circuit die out, as shown in FIG. 6(A) and FIG. 6(B). The duration of the overlap time period 306 is selected to be equal to or larger than the time constant $\tau$ so that after the overlap time period 306 has elapsed, the simulation results of the window 304 do not depend on one or more waveforms associated with the preceding window 302. In some embodiments, the duration of the overlap time period 306 is determined using an iterative method. For example, an arbitrary value $\tau_0$ is selected first and then iterative calculations are performed to determine a proper duration of the overlap time period 306 (e.g., equal to or larger than the time constant $\tau$) for performing the analyses and simulations.

Figure 3:
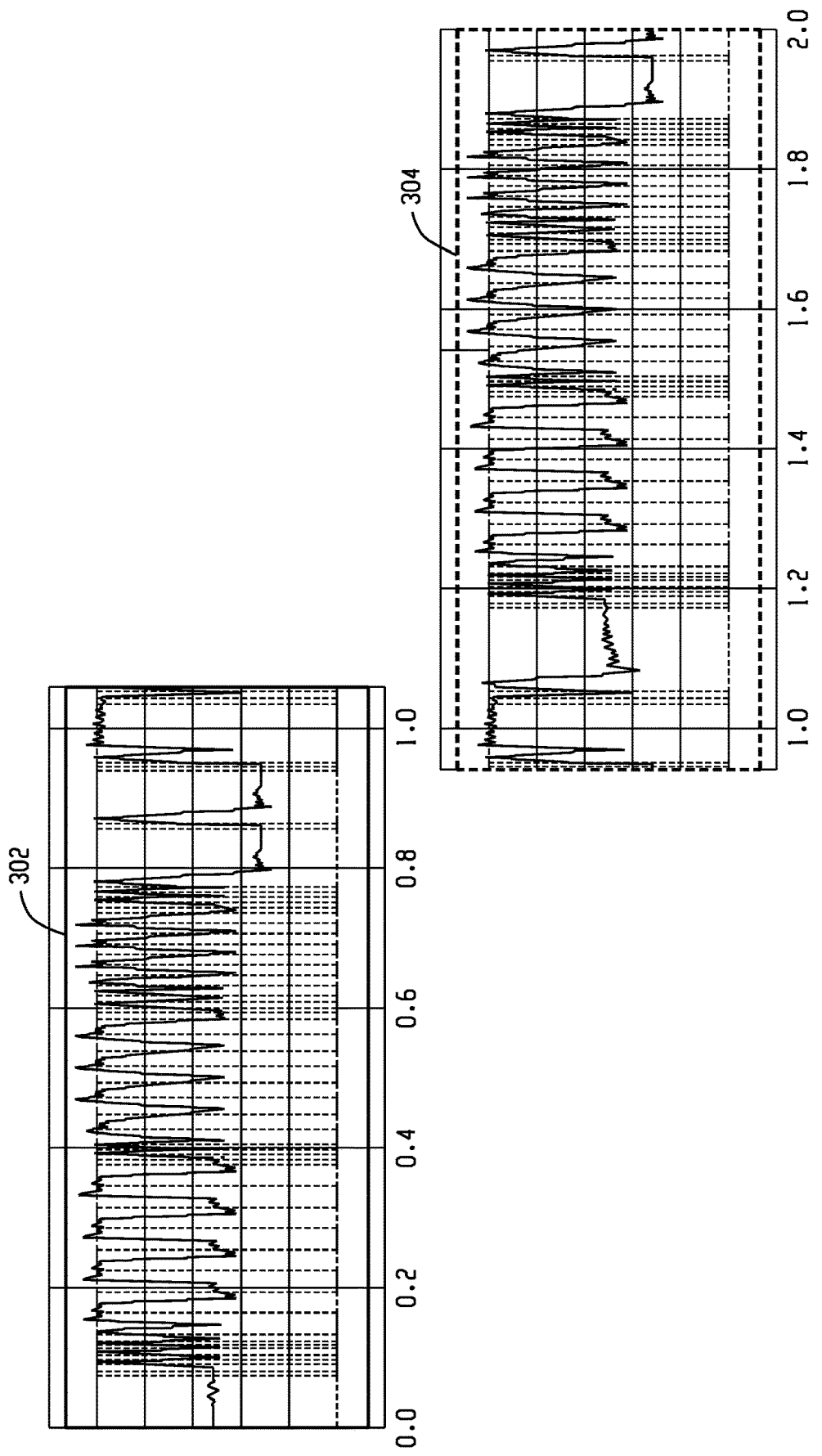
Figure 4:
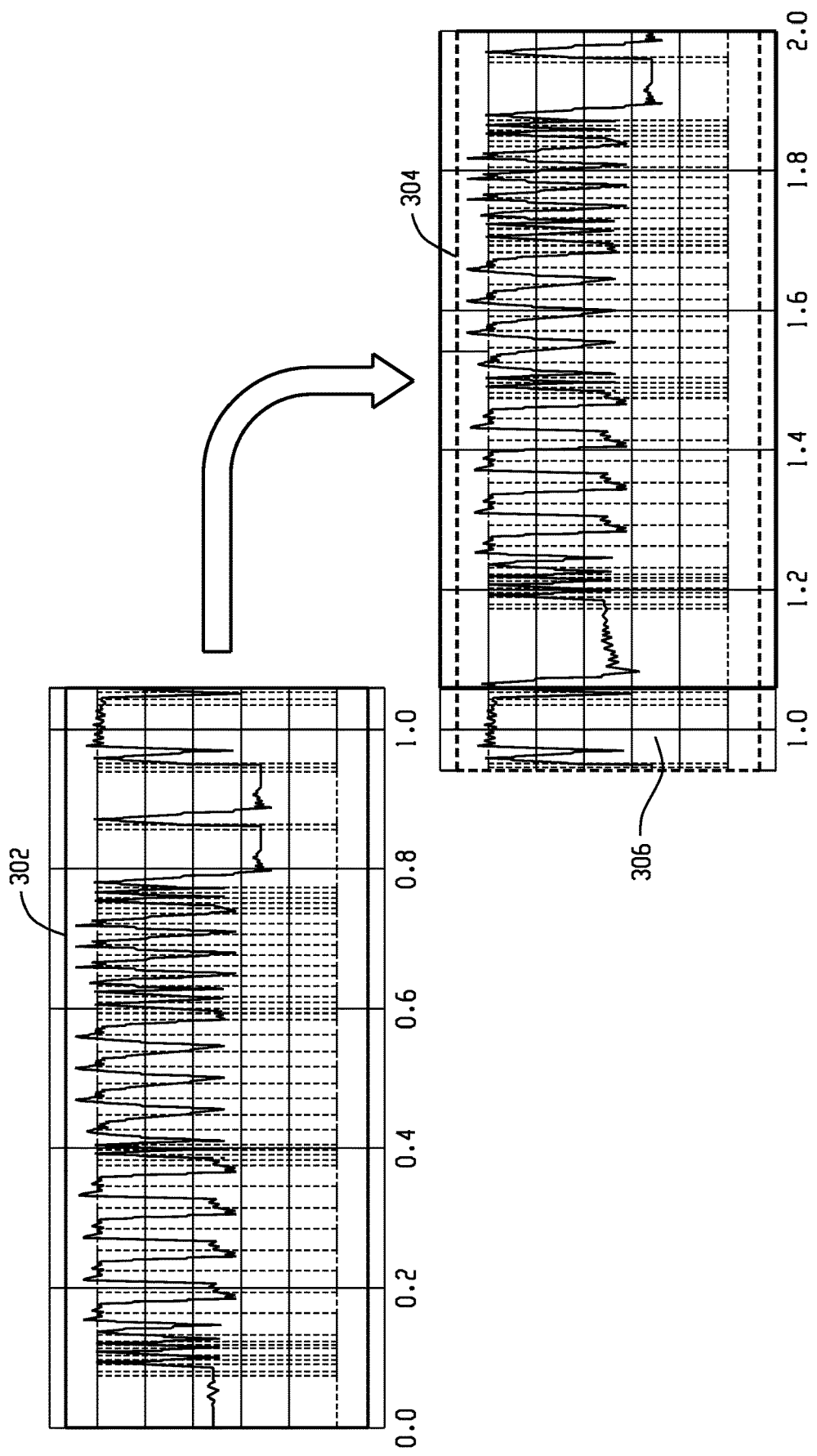
Figure 5:
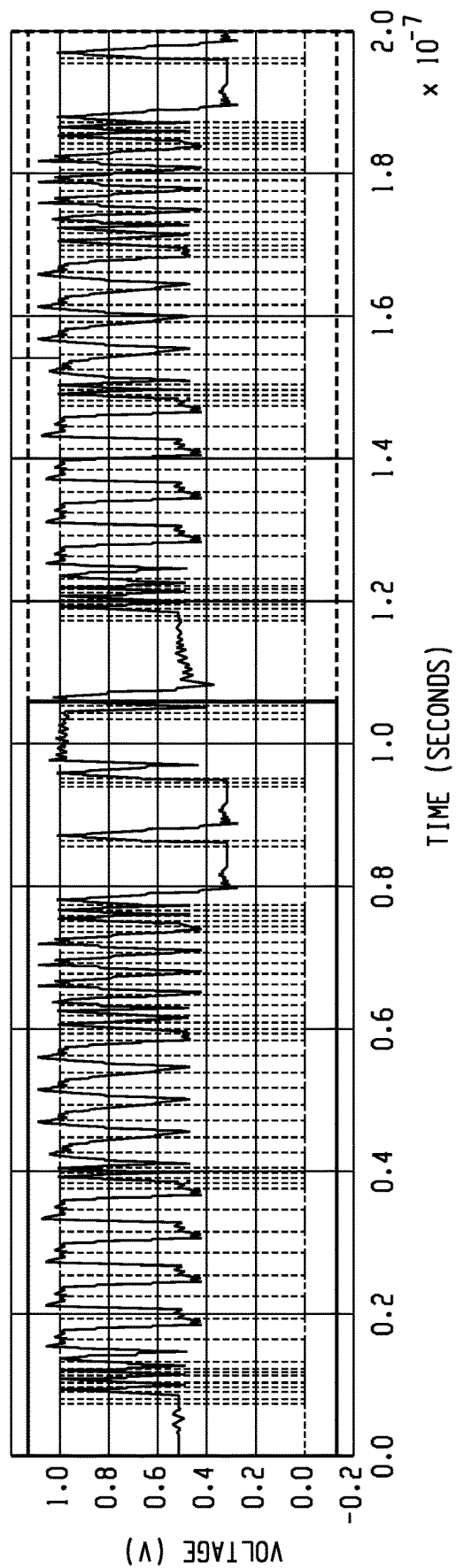

Simulations are performed for the windows 302 and 304 independently using two different processors respectively, as shown in FIG. 3. The window 302 corresponds to a first simulation window within the simulation length, and the simulation results associated with the window 302 are not affected by any preceding windows. Thus, the simulation results of the window 302 are accurate. On the other hand, the simulation results of the window 304 are affected by the preceding window 302. Particularly, as shown in FIG. 4, the simulation results of the overlap time period 306 in the window 304 are affected by the preceding window 302 and thus may not be accurate. After the overlap time period 306, the simulations results associated with the window 304 do not depend on initial conditions associated with the preceding window 302, and may be accurate. The overlap period 306 and the related simulation results are removed. Then, the remaining of the window 304 is concatenated to the preceding window 302 to generate an output that includes the simulation results of the window 302 and part of the simulation results of the window 304, as shown in FIG. 5.

Figure 7:
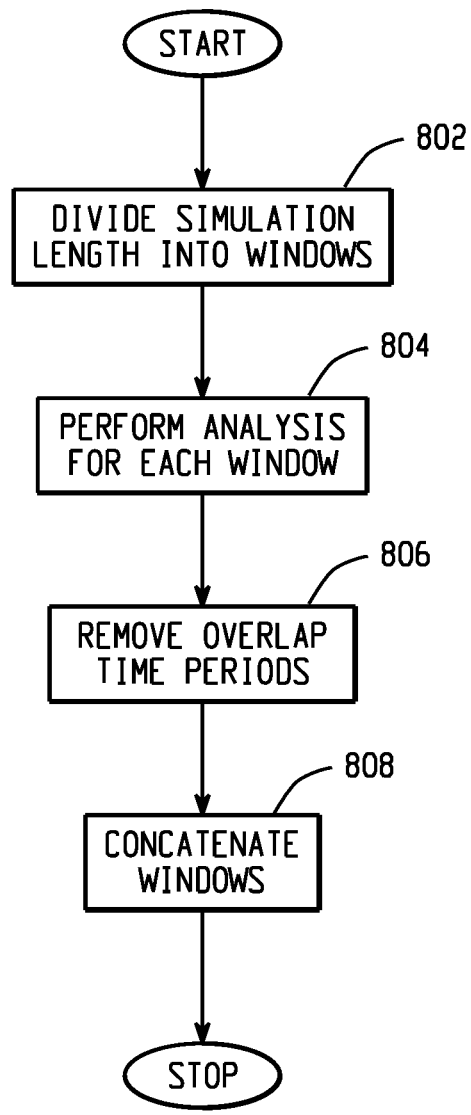
FIG. 7 depicts an example flowchart for performing transient analyses and simulations using a parallel time domain window technique.

FIG. 7 depicts an example flow chart for performing transient analyses and simulations using a parallel time domain window technique. At 802, a simulation length is divided into a number of windows, e.g., corresponding to a number of processors. For example, an overlap time period with a specific duration (e.g., equal to or larger than a time constant z) is padded at the beginning of each window (e.g., except the first window within the simulation length). At 804, transient analyses and simulations are performed for the windows in parallel using different processors respectively. At 806, the overlap time periods and the related simulation results are removed. At 808, after the removal of the overlap time periods, the windows are concatenated to generate an output.

Figure 8:
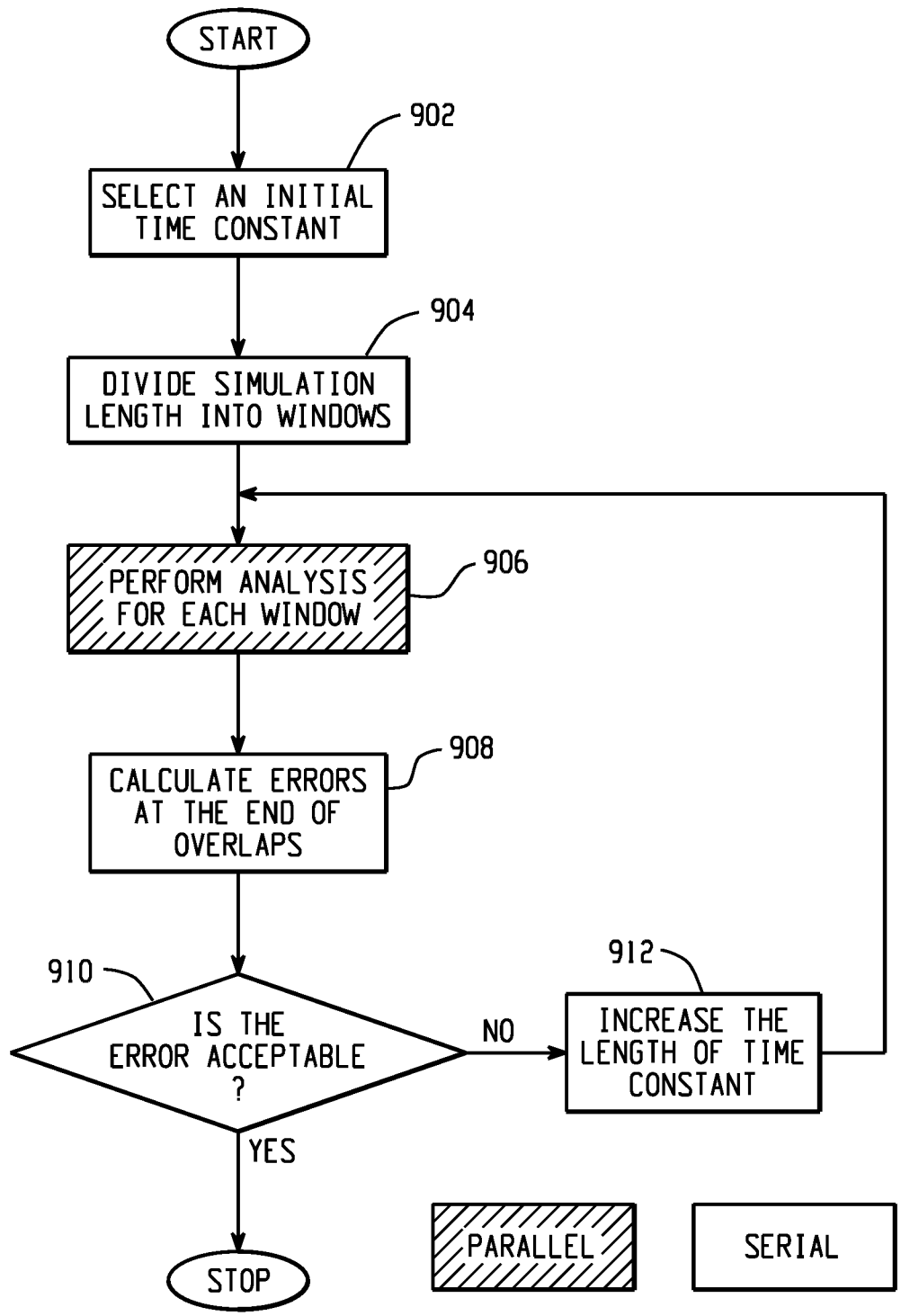
FIG. 8 depicts another example flow chart for performing transient analyses and simulations using a parallel time domain window technique.

Under some circumstances, the time constant z may not be known at the outset of the transient analyses and simulations and may not be easily calculated, e.g., for large nonlinear circuits. FIG. 8 depicts another example flow chart for performing transient analyses and simulations using a parallel time domain window technique. As shown in FIG. 8, an initial duration to is selected, and an iterative algorithm is used to generate a proper duration of an overlap time period (e.g., equal to or larger than the time constant r) for transient analyses and simulations.

Specifically, at 902, the initial duration to is selected. For example, the initial duration to is an arbitrary value. At 904, a simulation length is divided into a number of windows, e.g., corresponding to a number of processors. An overlap time period with a duration equal to the initial duration to is padded at the beginning of each window (e.g., except the first window within the simulation length). At 906, transient analyses and simulations are performed for the windows (e.g., in parallel using different processors respectively). At 908, errors at the end of the overlap time periods are calculated. At 910, it is determined whether the errors are within an acceptable range. At 912, if the errors are not within the acceptable range, the length of the duration is increased, and thus the durations of the overlap time periods are increased. Then, transient analyses and simulations are performed for each window, and the errors are calculated at the end of the adjusted overlap time periods again. The process continues until the calculated errors are within the acceptable range. In some embodiments, once the errors are determined to be acceptable, the corresponding overlap time periods and the related simulation results are removed, and the windows are concatenated to generate an output.

Figure 9B:
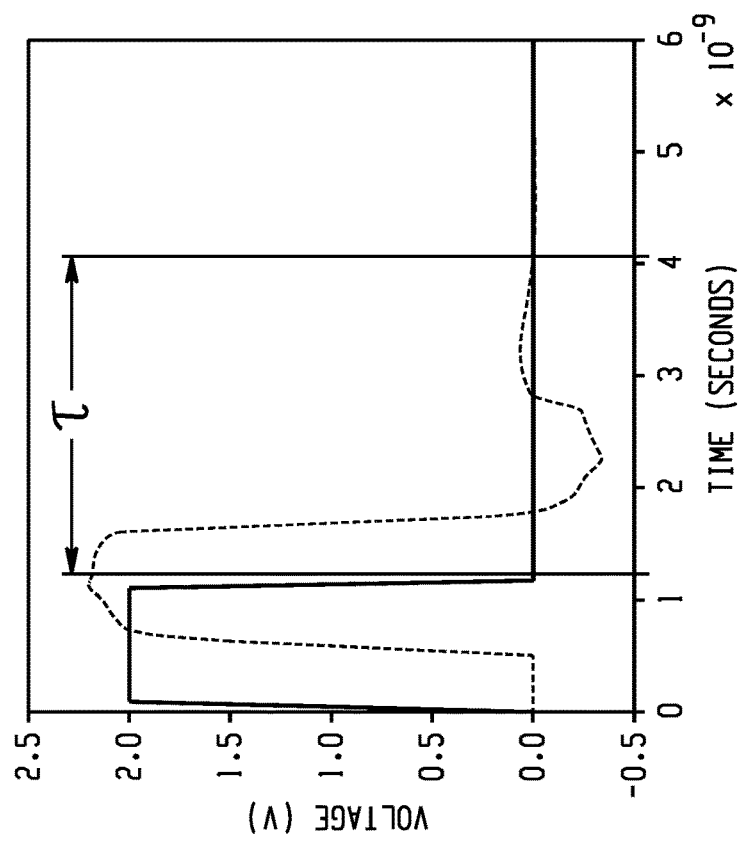
FIG. 9(A) and FIG. 9(B) depict example diagrams showing a simulation length and a time constant of an electrical circuit respectively.
Figure 9A:
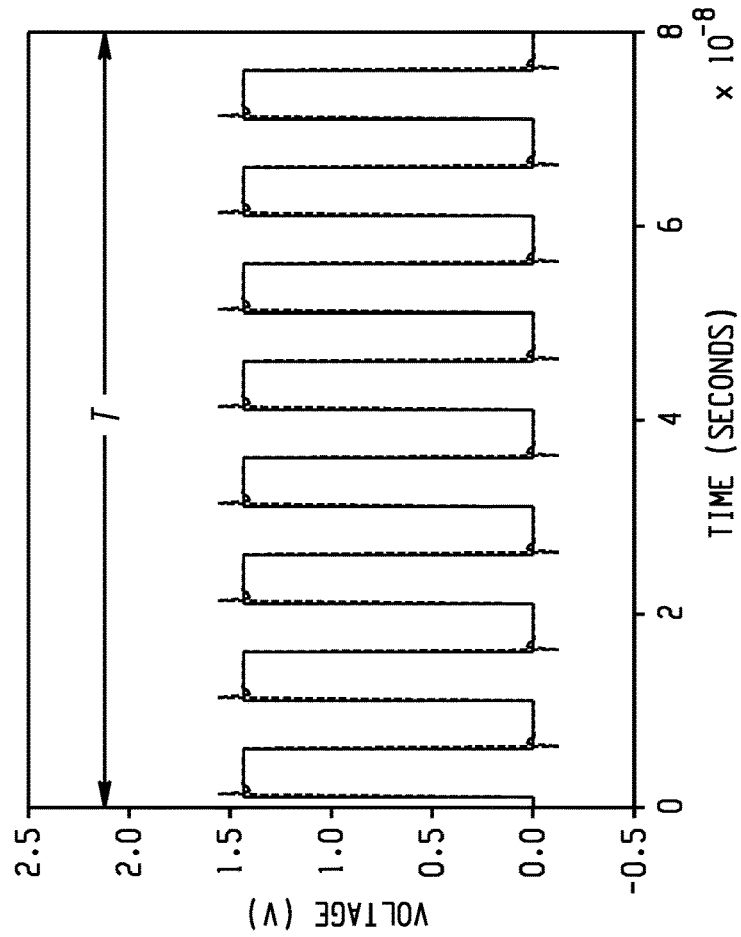

The implementation of parallel computing for transient analyses and simulations speeds up the entire simulation process, compared with executing the simulations on a single processor. A speed-up parameter n (e.g., a maximum attainable speed-up) can be determined based on a simulation length (e.g., T as shown in FIG. 9(A)) and a specific duration (e.g., τ as shown in FIG. 9(B)).

$$n \propto \frac{T}{\tau}$$

An increase in the simulation length T results in improvements of the speed up of the simulations. The speed-up parameter n varies with the duration τ. In some embodiments, after a certain increase of the number of the simulation windows that correspond to the number of processors (e.g., central processing unit cores) used for parallel transient simulations, the actual speed up of the simulations becomes close to the speed-up parameter n or the number of processors that are used. For example, the actual speed up of the simulations becomes close to the speed-up parameter n if n is smaller than the number of processors that are used.

Figure 10:
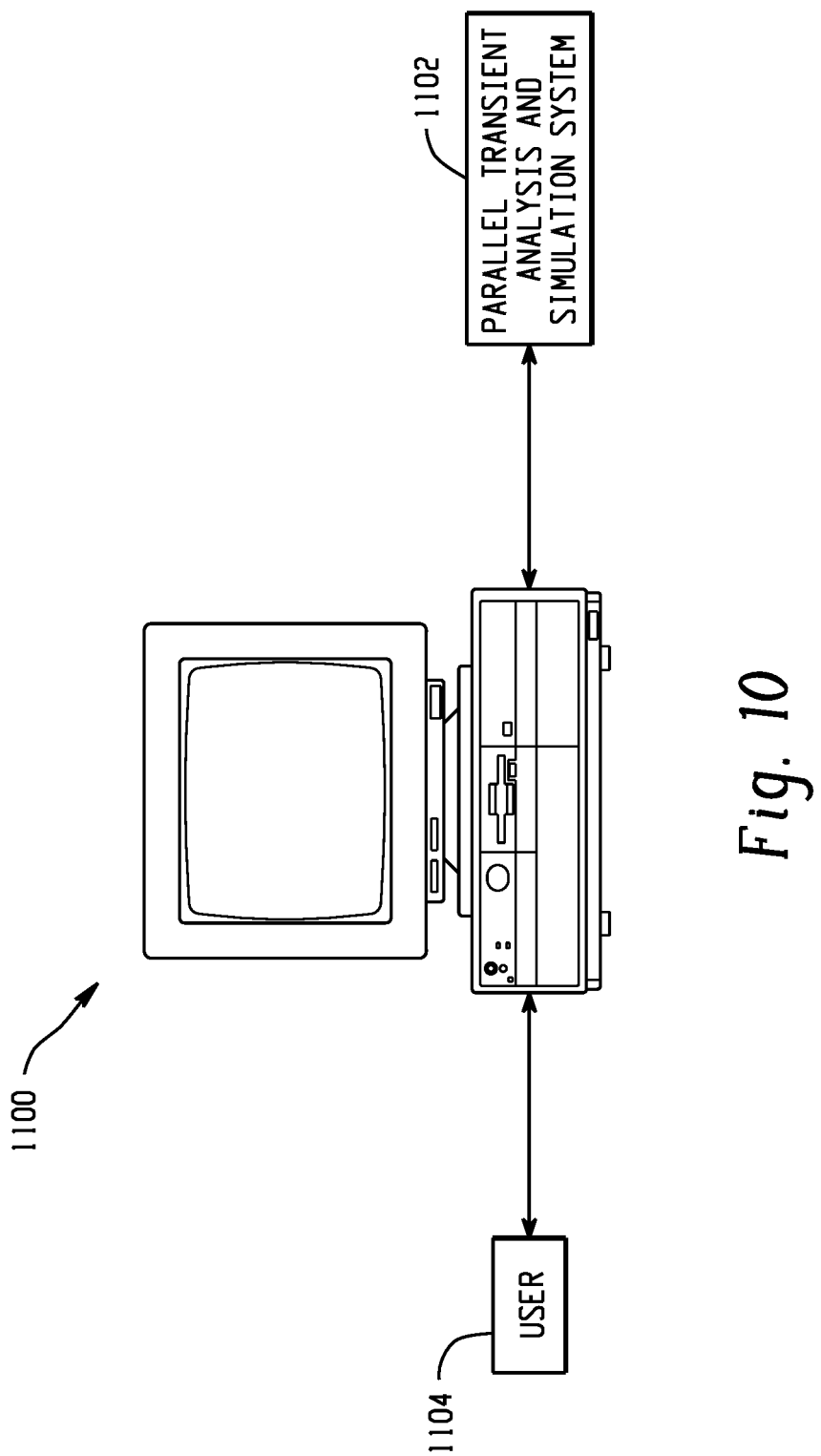
FIG. 10 depicts an example diagram showing a computing system hosting a parallel transient analysis and simulation system.

FIG. 10 depicts an example diagram showing a computing system hosting a parallel transient analysis and simulation system. The parallel transient analysis and simulation system 1102 is provided on a computing system 1100 for access by a user 1104. The parallel transient analysis and simulation system 1102 implements multiple processors (e.g., central processing unit cores) of the computer 1100 for performing parallel transient simulations to solve problems related to bit patterns.

In certain embodiments, the system 1100 includes 10 processors (e.g., central processing unit cores), 20 GB memory, and a 64-bit operating system. In some embodiments, the system 1100 includes 16 processors (e.g., central processing unit cores), 30 GB memory, and a 64-bit operating system. For example, the system 1100 corresponds to a stand-alone computer.

This written description uses examples to disclose the invention, including the best mode, and also to enable a person skilled in the art to make and use the invention. The patentable scope of the invention may include other examples. As an example, the systems and methods disclosed herein are configured to perform parallel transient analyses and simulations to solve bit pattern problems for large non-linear circuits, such as measuring a bit error ratio (BER). As another example, the systems and methods disclosed herein are configured to perform parallel transient analyses and simulations to solve bit pattern problems for a large number of bits (e.g., from hundreds to millions of bits). As yet another example, the systems and methods disclosed herein are configured to perform parallel transient analyses and simulations to speed up the analysis and simulation process (e.g., up to 10 times). As yet another example, the systems and methods disclosed herein are configured to offer better scalability compared to the existing technologies and require less processing before starting transient simulation.

For example, the systems and methods may include data signals conveyed via networks (e.g., local area network, wide area network, internet, combinations thereof, etc.), fiber optic medium, carrier waves, wireless networks, etc. for communication with one or more data processing devices. The data signals can carry any or all of the data disclosed herein that is provided to or from a device.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of non-transitory computer-readable storage medium that is stored at a single location or distributed across multiple locations. The medium can include computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, etc.) that contain instructions (e.g., software) for use in execution by a processor to perform the methods' operations and implement the systems described herein.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example, as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

It is claimed:

1. A processor-implemented method for circuit transient simulations, the method comprising:
    selecting a first period and a second period from a simulation period for an electrical circuit, the first period overlapping with the second period via an overlap time period, wherein a combination of the first period and the second period corresponds to the simulation time period;
    obtaining simulation results for the electrical circuit over the simulation time period, the simulation results including a first simulation result and a second simulation result for the electrical circuit respectively over the first period and the second period, wherein a part of the simulation results is associated with the overlap time period;
    generating a simulation output for the electrical circuit based on the simulation result, wherein the simulation output excludes the part of the simulation results associated with the overlap time period; and
    storing data related to the simulation results and data related to the first time period and the second time period.

2. The method of claim 1, wherein the first time period has a predetermined duration corresponding to a time constant of the electrical circuit.

3. The method of claim 1, wherein the first simulation result and the second simulation result are obtained in parallel.

4. The method of claim 1, wherein the generating the simulation output comprises:
    concatenating remaining part of the simulation results excluding the part of the simulation results associated with the overlap time period for generating the simulation output.

5. The method of claim 1, wherein the simulation period includes the first period and the second period, the first period preceding the second period.

6. The system of claim 5, wherein the second simulation result includes the part of the simulation results associated with the overlap time period.

7. The method of claim 1, further comprising:
    determining a duration of the overlap time period iteratively based on an error parameter.

8. The method of claim 7, wherein the determination comprises:
    performing a transient simulation for the electric circuit over a time period padded with a particular overlap time period;
    calculating a value of the error parameter associated with the particular overlap time period; and
    in response to the value of the error parameter not being within a range, adjusting duration of the particular overlap time period until the value of the parameter falls within the range.

9. The method of claim 8, wherein the duration of the particular time period was initially assigned according to a time constant of the electric circuit.

10. The method of claim 8, wherein the value of the error parameter is calculated for the end of the particular overlap time period.

11. The system of claim 8, wherein the adjustment increases the duration of the particular overlap time period.

12. The method of claim 7, wherein the duration of the overlap time period is equal to or larger than a time constant of the electrical circuit.

13. A non-transitory computer readable storage media storing instructions, which when executed by one or more processors, causes the one or more processors to perform operations comprising:
    selecting a first period and a second period from a simulation period for an electrical circuit, the first period overlapping with the second period via an overlap time period, wherein a combination of the first period and the second period corresponds to the simulation time period;
    obtaining simulation results for the electrical circuit over the simulation time period, the simulation results including a first simulation result and a second simulation result for the electrical circuit respectively over the first period and the second period, wherein a part of the simulation results is associated with the overlap time period;
    generating a simulation output for the electrical circuit based on the simulation result, wherein the simulation output excludes the part of the simulation results associated with the overlap time period; and
    storing data related to the simulation results and data related to the first time period and the second time period.

14. The non-transitory computer readable storage media of claim 13, wherein the first time period has a predetermined duration corresponding to a time constant of the electrical circuit.

15. The non-transitory computer readable storage media of claim 13, wherein the first simulation result and the second simulation result are obtained in parallel.

16. The non-transitory computer readable storage media of claim 13, wherein the generating the simulation output comprises:
    concatenating remaining part of the simulation results excluding the part of the simulation results associated with the overlap time period for generating the simulation output.

17. The non-transitory computer readable storage media of claim 13, wherein the simulation period includes the first period and the second period, the first period preceding the second period.

18. The non-transitory computer readable storage media of claim 17, wherein the second simulation result includes the part of the simulation results associated with the overlap time period.

19. The non-transitory computer readable storage media of claim 13, further comprising:
  determining a duration of the overlap time period iteratively based on an error parameter.

20. A system comprising:
  a network interface to receive data corresponding to a design of an electrical circuit;
  a storage device for transient simulation results of the electrical circuit; and
  one or more processors coupled to the network interface and the storage device, the one or more processors configured to:
    configure a duration of overlapping time periods for transient simulation of the electrical circuit,
    select a first period and a second period from a simulation period for the electrical circuit, the first period overlapping with the second period via an overlap time period of the duration, wherein a combination of the first period and the second period corresponds to the simulation time period,
    obtain simulation results for the electrical circuit over the simulation time period, the simulation results including a first simulation result and a second simulation result for the electrical circuit respectively over the first period and the second period, wherein a part of the simulation results is associated with the overlap time period, and
    generate a simulation output for the electrical circuit based on the simulation result, wherein the simulation output excludes the part of the simulation results associated with the overlap time period, wherein data related to the simulation results and data related to the first time period and the second time period are stored in the storage device.

* * * * *